Figure 1:
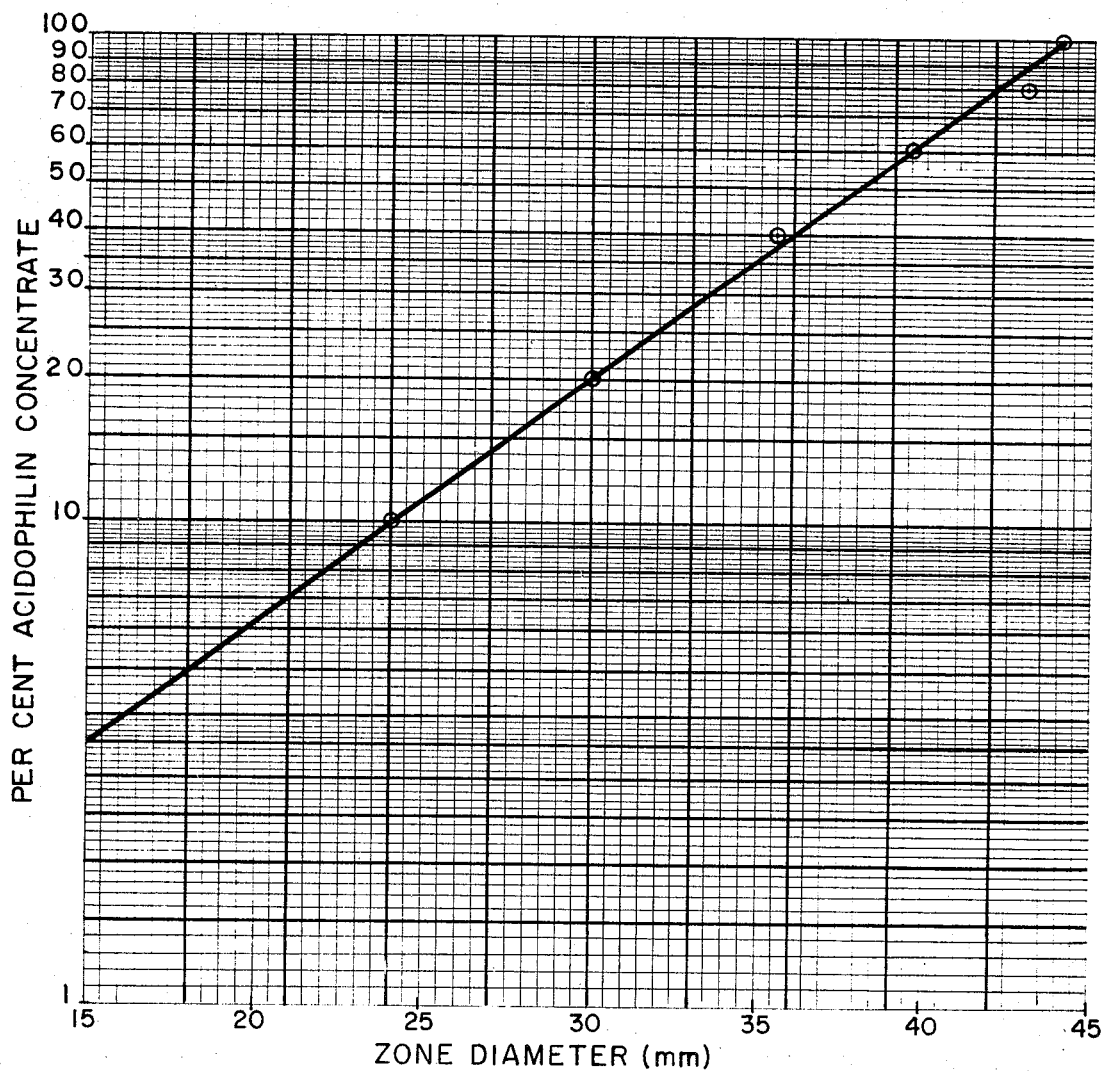

United States Patent
Shahani et al.

[15] 3,689,640
[45] Sept. 5, 1972

[54] ANTIBIOTIC ACIDOPHILIN AND PROCESS OF PREPARING THE SAME

[72] Inventors: Khem M. Shahani; Jayantkumar R. Vakil, both of Lincoln, Nebr.; Ramesh Chandra Chandan, Hitchin, England

[73] Assignee: The University of Nebraska, Lincoln, Nebr.

[22] Filed: Sept. 28, 1967

[21] Appl. No.: 676,001

Related U.S. Application Data

[63] Continuation-in-part of Ser. No. 542,874, April 15, 1966, abandoned.

[52] U.S. Cl. ................................. 424/118, 195/80
[51] Int. Cl. ............................................ A61k 21/00
[58] Field of Search .......... 167/65 AB, 65 A; 195/80; 424/118

[56] References Cited

OTHER PUBLICATIONS

Miller, The Pfizer Handbook of Microbial Metabolites, McGraw-Hill Book Company, Inc., New York, New York, 1961, page 522 (No. 1,019)

*Primary Examiner*—Jerome D. Goldberg
*Attorney*—Merriam, Marshall, Shapiro & Klose

[57] ABSTRACT

Disclosed is a new antibiotic. The antibiotic is produced by fermenting *Lactobacillus acidophilus* in a liquid medium containing constituents of milk, extracting the fermentate with alcohol, evaporating the alcohol to a residue, extracting the residue with acetone, evaporating the acetone and chromatographing the residue.

2 Claims, 3 Drawing Figures

STANDARD CURVE FOR DETERMINING UNITS OF ACIDOPHILIN IN VARIOUS PREPARATIONS.

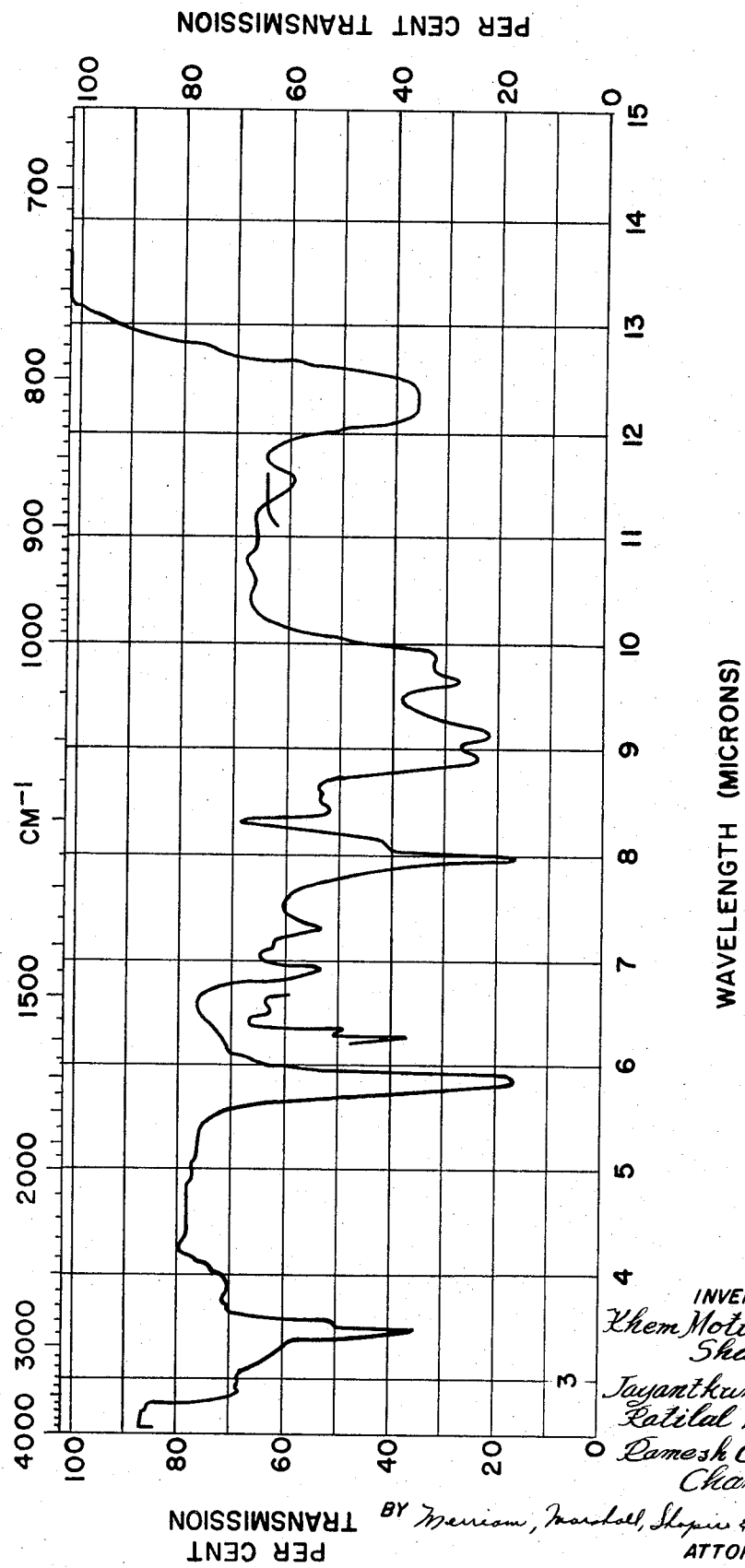

ANTIBIOTIC ACIDOPHILIN AND PROCESS OF PREPARING THE SAME

This application is a continuation-in-part of our copending application, Ser. No. 542,874 filed Apr. 15, 1966 now abandoned.

This invention relates to materials having antibacterial activity. More particularly, this invention is concerned with a new antibiotic, processes of producing it and uses of the antibiotic against pathogenic bacteria. It is also concerned with pharmaceutical compositions containing the antibiotic as an active ingredient.

According to the subject invention, there is provided a new antibiotic which has been named acidophilin. It can be produced by fermenting or culturing *Lactobacillus acidophilus* in a suitable nutrient medium. The acidophilin can then be recovered from the fermentation medium to give a product having sufficient antibacterial activity to be useful.

The potency of the acidophilin products are conveniently measured in units of activity. A unit of acidophilin activity is the amount of this antibiotic on a 12.7 mm paper disc that would develop a 25 mm zone of inhibition, under standard conditions, using *Pseudomonas fluorescens* as the assay organism.

The acidophilin products with which this invention is concerned contain a minimum of 2 units, and advisably at least 5 units, of acidophilin activity, as defined above, per mg of the product on a dry weight basis. Products having lower than 2 units of acidophilin per mg are considered to have insufficient potency to be useful antibacterial products according to this invention. The invention is also concerned with such products substantially free of lactic acid.

In the production of the acidophilin products of this invention, a suitable strain of *Lactobacillus acidophilus* is grown or propagated in an appropriate liquid nutrient medium, and particularly a liquid medium containing constituents of milk. It appears that various strains of *Lactobacillus acidophilus* produce different amounts of acidophilin. Therefore, various strains are screened and a strain selected which produces substantial amounts of the antibiotic.

The strain presently considered most useful is *Lactobacillus acidophilus* DDS 1 in the culture collection at the University of Nebraska, Department of Dairy Science. The morphological and cultural characteristics of *Lactobacillus acidophilus* DDS 1 are set forth below.

Morphology. (Studied in the milk medium) Gram positive. Rods, 0.6 to 0.9 by 1.5 to 6.0 microns, occurring singly, in pairs and in short chains with rounded ends; variable dimensions. Nonmotile. In old cultures of milk often a tendency towards gram negativeness is observed.

Temperature. Optimum temperature 37° C.; no growth between 20°–22° C; maximum between 43° and 45° C. No growth above 45° C.

Maintenance. The culture is maintained in skim milk and transferred every 2 to 3 weeks.

Growth. Microaerophilic; grows in milk — slow growth with small inoculum — coagulates from the bottom up. Litmus milk acidified with clot. pH of the milk after 48 hrs., 3.7 to 4.0; in the absence of carbohydrate very little growth or almost no growth. No growth on potato.

Gelatin. Not liquefield.

Carbohydrates metabolized. Produces acid from glucose, galactose, fructose, lactose, sucrose, mannose and maltose. Can grow in acid media, ferments amygdalin, cellobiose and salicin. Raffinose, trehalose and dextrin are fermented very slightly. Xylose, arabinose, rhamnose, glycerol, mannitol, sorbitol, dulcitol and inositol are not fermented.

In 1 percent lactose-APT medium at 37° C., the culture produces lactic, acetic and formic acids, glycerol, ethanol, $CO_2$, acetoin and diacetyl.

Special Studies. Grows in tomato juice broth containing 2% NaCl or 2 percent bile salts but not in broth containing 4% NaCl or 4 percent bile salts.

This organism is also on deposit in the ARS Culture Collection Investigations, Northern Utilization Research and Development Division, United States Department of Agriculture, Peoria, Ill. as type culture NRRL B-3208.

*Lactobacillus acidophilus* can be conveniently grown in sterilized skim milk at a temperature of about 35° to 37° C. for such time as is necessary to obtain optimum growth, and generally 46 to 48 hours. At a fermentation temperature of 37° C., growth for about 48 hours often gives maximum acidophilin antibiotic activity. The medium is sterilized prior to inoculation with *Lactobacillus acidophilus*. The inoculation is effected using standard techniques and procedures to assure maximum growth, and high antibiotic activity, in a reasonably short time. During the fermentation period, the temperature of the medium is maintained to achieve the desired growth. The fermentation is terminated once sufficient growth has been achieved. This is generally after the medium contains about 7 to 10 units of acidophilin per ml of medium.

The acidophilin activity of the fermentate produced by growing *Lactobacillus acidophilus* in a milk medium is very thermostable. Batch pasteurization at 62° C. for 30 minutes, or a high temperature, short time pasteurization at 72° C. for 15 seconds, has no adverse effect upon the acidophilin activity of the fermented milk medium. Also, heating at 55° C. for 48 hours, steaming for 15 minutes, or autoclaving does not impair the acidophilin in the fermentate.

To recover the acidophilin from the fermentate, it is generally advisable to first eliminate the water and other volatiles present. This can be done in a number of ways, such as by lyophilization or freeze-drying, or evaporating the fermentate to dryness. This dried residue can contain in the neighborhood of about 0.05 to 0.15 (av. about 0.1) unit of acidophilin activity per mg of dry weight. The resulting dried residue is then extracted with suitable solvents after which it is chromatographed to obtain the acidophilin as a concentrated product. By employing reduced temperatures in the area of about 4°–10° C. for the extractions and chromatography, higher recoveries of acidophilin can be obtained than at increased temperatures. However, use of ambient temperature gives acceptable results.

Presently, it is considered advisable to first extract the dried residue with methanol, or some other lower alcohol, such as ethanol or butanol. Repetitive extractions with a lower alcohol, and particularly methanol, aliquots about equal in weight to the dried residue are suitable. The alcohol is then removed and the liquid residue added to water. The aqueous solution is then repetitively extracted with a water immiscible solvent, and advisably with acetone. The solvent is then evaporated under vacuum and the yellowish syrupy residue dissolved in water. The aqueous solution may be chromatographed, such as on a suitable dextran or silica gel column, to obtain active fractions of higher activity and, when desired, the volatiles removed from the active fractions to obtain an acidophilin concentrate.

The aqueous solution can be chromatographed on a column of dextran suitable for chromatography, such as Sephadex G–50, using a 0.1 M NaCl – 0.02 N HCl aqueous solution, pH 2.5–3.0 as the eluant. Aliquots of the eluating solvent can be used for the chromatography, the active fractions collected and evaporated to obtain concentrated acidophilin. In this way, the residue obtained following the lower alcohol and acetone extractions having an activity of about 2 units of acidophilin per mg dry weight, is concentrated to active fractions having a minimum of 5 units of acidophilin per mg. The more active fractions will generally contain at least 7, and up to 10 or more, units of acidophilin par mg of dry weight. There is thus achieved a concentration of at least 50 times the acidophilin activity present in the dried residue obtained by evaporating the fermented medium (fermented acidophilus milk) to dryness.

An alternative and more efficient method of concentrating the acidophilin is to chromatograph the residue, obtained after the lower alcohol-acetone extraction, on silica gel. The said residue can be dispersed on silica gel, such as in a column, using chloroform to aid the dispersion. After eluting the chloroform, a second chloroform elution can be used followed by repeated elution with a chloroform-lower alcohol mixture, such as 95:5 v/v to about 90:10 v/v ratios of the components. A chloroform-butanol (95:5 v/v) solution is considered most suitable. The eluate fractions obtained with the chloroform-lower alcohol mixture contain most of the acidophilin activity. After evaporating the solvent, these fractions contain at least 3.0 units, and some fractions will contain 5 to 10 units, of acidophilin per mg dry weight. Chromatography on silica gel is especially suitable for obtaining acidophilin essentially free of lactic acid. In some cases, some of the fractions will even be free of detectable amounts of lactic acid.

Under acidic conditions, acidophilin in the concentrated or aqueous solution is fairly stable both at room temperature and in a refrigerator. It can be held frozen without loss of activity for a considerable length of time. Repeated freezing and thawing, however, partially destroy its activity. Under neutral pH conditions, the antibiotic is unstable to heat and storage.

In vitro tests showed acidophilin to have a broad antibacterial spectrum against gram positive and gram negative bacteria as is shown by the data in the examples.

Because of its in vitro antibacterial activity, acidophilin can be used to prevent or retard bacterial contamination on equipment and packaging materials. Acidophilin can also be incorporated in cutting oils where bacterial growth is a problem. It can be incorporated in rubber to suppress clouding caused by growth of Pseudomonads. It can also be used as an antibacterial standard against which to screen other materials for antibacterial activity.

The following examples are presented to illustrate the invention.

EXAMPLE 1

To 10 ml of sterilized skim milk is added a loop of *Lactobacillus acidophilus* obtained from a previously prepared acidophilus culture grown in milk or from a lyophilized acidophilus culture. The 10 ml of inoculated milk is then incubated at 37° C. for 24 to 36 hours. This stock culture is subcultured several times in milk before it is used as the inoculum. Fifty milliliters of inoculum so prepared in this manner is added to a 1 liter portion of sterilized skim milk, and the whole incubated for 48 hours at 37° C. The resulting product is called herein fermented acidophilus milk and contains about 0.05 to 0.15 unit of acidophilin per mg of dried solid materials therein.

The fermented acidophilus milk is then lyophilized or freeze-dried. Approximately 120 to 150 g of dried powder residue remains after lyophilizing. All of the powder is then dispersed in 1 liter of methanol cooled to 4° – 10° C. and the dispersion centrifuged to remove the solid materials. This is repeated two more times with 1 liter amounts of cool methanol. The 3 liters of methanol extract are then combined and the methanol evaporated under reduced pressure at about 40° C. A yellow liquid residue (10–20 ml) remains. All the liquid extract is then dissolved in water to bring the volume to 100 ml.

The 100 ml solution is then extracted with 1,000 ml of acetone at 4° – 10° C. and the acetone extract centrifuged to remove solids. Two more identical acetone extractions are employed and the three 1,000 ml acetone extracts combined. The acetone is evaporated under reduced pressure at about 40° C. leaving about 40 ml of a very viscous yellow liquid residue containing acidophilin. Water is then added to bring the volume to 100 ml. This solution is referred to as the M-A concentrate. On a dry basis it has a specific activity of about 2.24 units of acidophilin per mg.

Ten ml of the resulting M-A concentrate solution is applied to a 32 cm by 2.5 cm dextran (Sephadex G–50– Pharmacia) chromatography column. Sephadex G–50 is a modified dextran in which cross-linking is controlled to give a three dimensional network of interstices or pores. It contains an abundant hydroxyl group content in the reticulated polysacharride structure and is nonionic. The dextran column is prepared by dispersing 15–20 g of the dextran material in a 0.1 M NaCl – 0.02 N HCl (pH 2.5) aqueous solution at about 4° –10° C. and adding the dispersion to a glass column. The column is chromatographed using the same 0.1 M NaCl – 0.02 N HCl solution. Nine 50 ml eluate fractions are obtained, out of which only the most active fractions are used. Each fraction is concentrated to remove water and then made up to 5 ml volume with water, or to any other known volume that is suitable. Each concentrated fraction is then assayed against *Pseudomonas fluorescens* to determine its acidophilin potency, using the disc assay method.

The disc assay method is generally used with undiluted fermented acidophilus milk and appropriately diluted acidophilin concentrate preparations. The method is as follows:

Eight ml of melted nutrient agar (containing 0.3% NaCl) inoculated with 1 percent of 18 to 24 hour old nutrient broth culture of the test organism *Pseudomonas fluorescens* is poured into a sterile petri dish (Pyrex, 90 × 20 mm size). The seeded agar is allowed to solidify in the petri dish. A sterile filter paper disc of 12.7 mm diameter is dipped into the test solution of the acidophilin, the excess material is removed from the disc and the disc is put on the seeded agar plate surface. Several discs can be placed on each plate. Each test material is assayed in duplicate. The plates are preincubated at 10° C. for 2 hours to allow the test material to diffuse into the agar, and then incubated at 27° ± 2° C. for 16 to 18 hours. Following the incubation, the diameter of the zone of inhibition of the test organism is measured. The data is reported in Table 1 as averages of duplicates.

TABLE 1

Assay of acidophilin activity by disc assay method

| Composition of diluted acidophilin (v/v) | | Diameter of inhibition zone (mm) | Units* |
|---|---|---|---|
| Acidophilin concentrate | Water | | |
| 0 | 100 | 0 | 0 |
| 10 | 90 | 24.0 | 0.88 |
| 20 | 80 | 30.0 | 1.75 |
| 40 | 60 | 35.5 | 3.40 |
| 60 | 40 | 39.5 | 5.40 |
| 80 | 20 | 43.0 | 8.00 |
| 100 | 0 | 44.0 | 9.00 |

*Based upon the definition of 1 unit being equivalent to the amount of acidophilin giving a 25 mm zone of inhibition of *Pseudomonas fluorescens*, under standard assay conditions.

Figure 2:
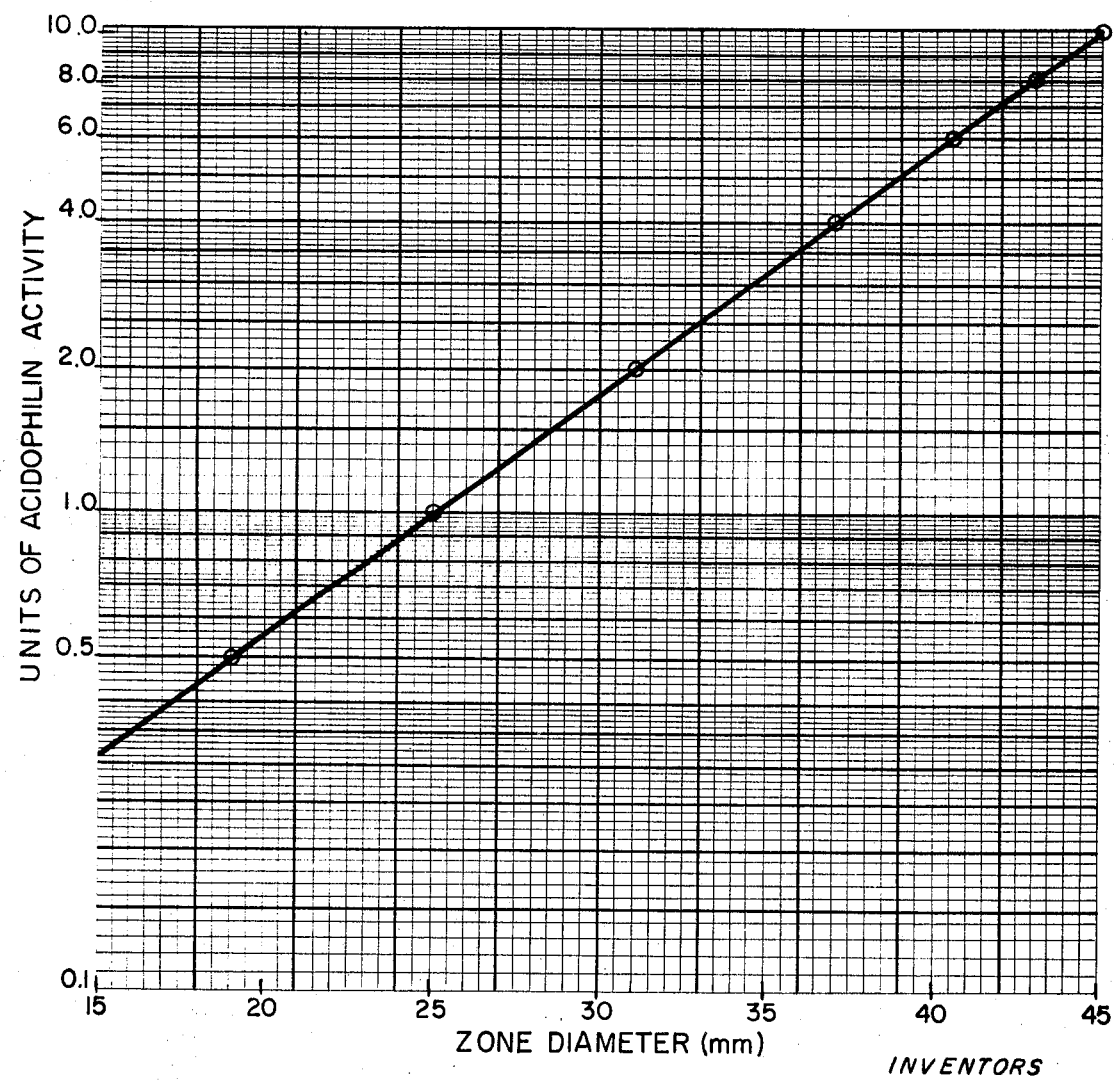

On the basis of these observed values, a curve is drawn on a semi-log paper, plotting the zone diameter in mm against log values of different concentrations of acidophilin. FIG. 1 of the drawings shows the resulting curve. The plot gives a straight line function with a slope of 6. As previously stated, a unit of acidophilin is that amount of acidophilin which gives a 25 mm zone of inhibition of *Pseudomonas fluorescens*, under the standard assay conditions. Therefore, a standard curve is drawn with a slope of 6 and passing through the point of the 25 mm zone being equal to 1 unit. FIG. 2 shows the resulting curve. As set forth in Table 1, a 10 percent dilution of acidophilin concentrate showed a 24 mm zone of inhibition of the test organism, and is, therefore, equivalent to 0.88 unit of acidophilin (read from the curve of FIG. 2). Similarly, the number of units of acidophilin in each of the other dilutions are calculated from their respective zones of inhibition and found to range from 1.75 to 9.0.

The concentrated 5 ml amounts of acidophilin from fractions 3, 4 and 5 (active fractions) are combined and can be used to determine antibacterial inhibition against various organisms by the serial dilution-turbiditimetric method. To 8 ml aliquots of nutrient broth containing 0.3% NaCl in test tubes are added varying concentrations (ranging between 0 to 1 ml) of acidophilin concentrate. The tubes containing no acidophilin constitute the control tubes. The volume is then made to 9 ml with sterilized distilled water. One milliliter of each test culture is added to the tube, following which the tubes are incubated at the optimum temperature of the organism for 16 to 18 hours. The optical density of the tubes is then determined in a spectrophotometer at 640 mμ and the concentration of acidophilin concentrate causing 50 percent inhibition of each organism is calculated. The results are reported in Table 2. In general, 30 to 60 ug, or 0.2 to 0.4 unit, of acidophilin per ml of aqueous solution caused 50 percent inhibition of the organisms. Organisms 17 to 27 in the table are common pathogens.

TABLE 2

In vitro antibacterial activity of acidophilin

| No. | Test organisms | Strain [1] | $IC_{50}$[2] ug/ml |
|---|---|---|---|
| 1 | Bacillus subtilis | ATCC 6633 | 30 |
| 2 | Bacillus cereus | Difco 902072 | 29 |
| 3 | Bacillus stearothermophilus | ATCC 7954 | 43 |
| 4 | Streptococcus faecalis | ATCC 8043 | 45 |
| 5 | Streptococcus faecalis var liquefaciens | ATCC 4532 | 42 |
| 6 | Streptococcus lactis | NU $C_{10}$ | 30 |
| 7 | Streptococcus lactis | NU $C_2$ | 38 |
| 8 | Lactobacillus lactis | (LY-3 France) | 40 |
| 9 | Lactobacillus casei | ATCC 7469 | 42 |
| 10 | Lactobacillus plantarum | ATCC 8014 | 60 |
| 11 | Lactobacillus leichmannii | ATCC 7830 | 59 |
| 12 | Lactobacillus leichmannii | ATCC 4797 | 58 |
| 13 | Sarcina lutea | ATCC 9341 | 30 |
| 14 | Serratia marcescens | NU | 29 |
| 15 | Proteus vulgaris | NU | 30 |
| 16 | Escherichia coli | NU | 32 |
| 17 | Salmonella typhosa | ATCC 167 | 30 |
| 18 | Salmonella schottmuelleri | ATCC 417 | 30 |
| 19 | Shigella dysenteriae | ATCC 934 | 30 |
| 20 | Shigella paradysenteriae | ATCC 9580 | 30 |
| 21 | Pseudomonas fluorescens | NU | 30 |
| 22 | Pseudomonas aeruginosa | (ear infection) | 30 |
| 23 | Pseudomonas aeruginosa | (green diarrhoea) | 60 |
| 24 | Staphylococcus aureus | NU (coagulase + ve)[3] | 50 |
| 25 | Staphylococcus aureus | Phage 80/81 | 60 |
| 26 | Klebsiella pneumoniae | ATCC 9997 | 60 |
| 27 | Vibrio comma | ATCC 9459 | 30 |

[1] Strains designated NU are in the culture collection at the University of Nebraska, Department of Dairy Science; also the designations $C_{10}$ and $C_2$ refer only to strain numbers of NU strains.
[2] Acidophilin concentration causing 50% inhibition of the growth of the test organisms.
[3] This culture produces the enzyme coagulase and is thus generally pathogenic.

EXAMPLE 2

The fractionation of acidophilin by silica gel chromatography is carried out as follows:

A column (38 mm diameter, 230 mm length) with a fritted glass disc sealed into a standard taper joint is attached to a 250 ml suction flask and silica gel column material is poured in, in two sections.

Bottom section A filter paper disc is first placed on the fritted glass bottom of the column and 25 ml of a silica gel slurry, prepared by mixing 50 g of silicic acid, 100 mesh, with 30 ml of 2 M phosphate buffer, pH 6.4, and 200 ml of chloroform, is poured in. Suction is applied gently, and a filter paper disc is placed on top of the bottom section.

Top section Twenty milliliters of the methanol: acetone extract (M-A concentrate), prepared as in Example 1, is mixed thoroughly with 40 g of silicic acid, slurried with 200 ml of chloroform and transferred quantitatively onto the top of the bottom section of the column. Suction is applied so that the eluant flow is approximately 30 ml/min at the start. When all the chloroform is eluted (constituting the first fraction), a second 200 ml fraction is collected using plain chloroform as the eluant. Similarly, 200 ml fractions 3 to 8 are collected using a chloroform:n-butanol (95:5 v/v) mixture as the eluant.

All eight fractions are separately concentrated at 40° C. on a rotary evaporation apparatus until no further decrease in volume is observed. The concentrated fractions are then made up to 2 ml with distilled water, and assayed by the disc assay method described earlier.

A typical example of purification and yield of acidophilin as obtained from an active sample of fermented acidophilus milk, using the described silica gel method, is given in Table 3. As shown in Table 3, the fermented acidophilus milk had 7.5 units of activity per ml of the undiluted original acidophilus fermentate and a specific activity of 0.077 unit/mg. The methanol:acetone concentrate (M-A), obtained from 1 liter of the acidophilus milk, had 40 units of activity per ml of undiluted sample and specific activity of 2.245 units/mg. Thus, the methanol:acetone concentrate showed a purification of 29 fold with 53 percent yield. The specific activity values for the first eight different fractions obtained from the silica gel column chromatography and their respective purification values are also given in Table 3. Fractions 1, 2 and 3 do not possess antibiotic activity, fraction 4 is questionable, fractions 5, 6, 7 and 8 possess antibiotic activity and are essentially free of lactic acid, and fractions after eight possess a low level of antibiotic activity and sometimes contain traces of lactic acid. The presence or absence of lactic acid is determined by the lactic dehydrogenase techniques according to Nielands in Methods in Enzymology, Vol. 1, p. 449, Academic Press, 1955. As shown in Table 3, the pooled lactic acid-free acidophilin fractions (fractions 5 to 8) possess a specific activity of 6.394 units/mg with an 83 fold concentration. These pooled fractions on further purification by thin layer chromatography (TLC) on silica gel plates give acidophilin with a specific activity of 19 units/mg, constituting a 247 fold concentration. In general, approximately 53 ug of this concentrated acidophilin material constitutes 1 unit.

The antibacterial activity of the various fractions was determined. The organisms tested and the inhibition obtained are reported in Table 4.

TABLE 4

Zone of Inhibition (mm)

| Fractions | Pseudomonas fluorescens | Pseudomonas aeruginosa | E. coli | Staphylococcus aureus |
|---|---|---|---|---|
| 1 | 0 | 0 | 0 | 0 |
| 2 | 0 | 0 | 0 | 0 |
| 3 | 0 | 0 | 0 | 0 |
| 4 | 28 | 19 | 25 | 32 |
| 5 | 41 | 28 | 33 | 43 |
| 6 | 40 | 28 | 36 | 38 |
| 7 | 40 | 27 | 37 | 40 |
| 8 | 33 | 21 | 31 | 31 |
| Pooled fractions (5 to 8) Silica gel | 38 | 22 | 32 | 36 |
| (TLC) fractions (conc) | 55 | 31 | 42 | 46 |

The silica gel TLC purified acidophilin when diluted 1/20 with water and tested using the described disc assay, gave 29 to 30 mm zone with *Pseudomonas fluorescens* and *Staphylococcus aureus*.

Acidophilin, fractions 5–8 isolated and pooled as described, is lactate-free and pure. On silica gel thin layer plates, using chloroform:methanol (90:10 percent) as the developing solvent system, it moves as a single compound, indicating a homogeneous product. Under these conditions, acidophilin moves on the plates with an Rf value of 0.49. On the plates, the active material can be detected by U.V. light, by $H_2SO_4$ charring, or by iodination. Also on aluminum oxide thin layer plates, with the same solvent system, it moves as a single moiety with an Rf value of 0.38.

The following characterizing data for acidophilin was obtained using a sample obtained by pooling fractions 5–8 as described and purifying it on silica gel thin layer plates using chloroform:methanol (90:10 percent) as the developing solvent system. The purified product is an iridescent slightly yellowish brown liquid.

The molecular weight and elemental composition of

TABLE 3
Purification and yield of acidophilin

| Fraction | Volume ml | Acidophilin activity units/ml undiluted | Dry weight mg/ml | Specific activity units/mg | Purification | Yield percent |
|---|---|---|---|---|---|---|
| Acidophilus milk | 1,000 | 7.5 | 96.69 | 0.077 | 1 | 100 |
| Methanol: acetone concentrate (M-A) | 100 | 40.0 | 17.82 | 2.245 | 29 | 43 |
| Silica gel chromatography fractions: | | | | | | |
| 1 | 10 | 0 | 0 | 0 | | |
| 2 | 10 | 0 | 0 | 0 | | |
| 3 | 10 | 0 | 0 | 0 | | |
| 4 | 10 | 45.0 | 7.59 | 5.929 | 77 | |
| 5 | 10 | 67.0 | 9.57 | 7.001 | 91 | |
| 6 | 10 | 56.0 | 10.23 | 5.474 | 71 | |
| 7 | 10 | 63.0 | 12.21 | 5.159 | 67 | |
| 8 | 10 | 45.0 | 4.29 | 10.489 | 136 | |
| Pooled lactic acid-free fractions (5 to 8) | 40 | 58.0 | 9.07 | 6.394 | 83 | |
| Silica gel TLC fractions (concentrated) | 4 | 85 | 4.5 | 19.00 | 247 | 4.5 | acidophilin compared to other materials previously isolated from milk are shown in Table 5.

TABLE 5

|  | Lactic acid | Thymidine diphosphate rhamnose | Lactobacillic acid | Acidophilin |
|---|---|---|---|---|
| Mol. Wt. | 90 | 532 | 328 | about 284 |
| C % | 40 | 36 | 69.5 | 50.28 |
| H % | 6.6 | 4.8 | 10.97 | 8.85 |
| O % | 53.4 | 42.1 | 19.5 | 39.5 |
| P % | 0 | 11.5 | 0 | <0.1 |
| N % | 0 | 5.2 | 0 | 1.82 |

Acidophilin is highly acidic, and an aqueous suspension of the compound (approximately 14 mg/ml) has a pH of about 2.8. At that pH, it is very stable and can be stored for over a week at room temperature (25° C.) or in a refrigerator (10° C.) without any loss of antibiotic activity. Also, at that pH, it can withstand even steaming for 30 minutes or autoclaving at 15 psi for 15 minutes. With an increase in the pH of the suspension, acidophilin becomes increasingly unstable. When adjusted to pH 4.5 with NaOH or $Na_2CO_3$, acidophilin at room temperature loses 7 percent of its antibiotic activity in 2 days, 50 percent in 4 days and 100 percent in a week, and in a refrigerator, it loses 7 to 100 percent of its antibiotic activity in 2 to 7 days. At pH 4.5, steaming or autoclaving inactivates the antibiotic almost completely.

Upon neutralization of an acidophilin suspension to pH 7.0, the antibiotic becomes exceedingly unstable. It loses nearly 80 percent of its potency instantaneously and loses the remaining activity within a day or two, whether stored at room temperature or in a refrigerator. Also, at pH 7.0, it loses its activity completely upon heating. Table 6 gives specific data on acidophilin stability.

The ultraviolet spectrum of acidophilin in water has no well-defined peak below 230 m$\mu$. There appears to be a point of inflection at about 280 m$\mu$ and a shoulder between 200 and 290 m$\mu$.

The infrared absorption spectrum of the acidophilin in chloroform is illustrated in FIG. 3 of the accompanying drawings. The more significant of the characteristic peaks occur at the following wave lengths expressed in microns ($\mu$), 3.48, 5.87, 6.92, 7.32, 7.97, 9.15, 9.70, 12.2–12.4 (broad). The infrared spectrum has a maximum at 1,722 $cm^{-1}$, and shows absorption in the hydroxyl region indicating hydrogen bounded hydroxyl. The presence of a carboxyl group is suggested. There is no absorption characteristic of an aromatic ring, nor is there the strong hydroxyl absorption one might except from a carbohydrate.

Acidophilin in 0.5 solution with chloroform had a very small specific rotation at 589 m$\mu$ [$(\alpha)_D^{25} = -7°$ (C, 0.5%; $CHCl_3$)], showing its low optical activity which is further supported by negligible rotation at other wave lengths [$(\alpha)_{578}^{25} = 0$; $(\alpha)_{436}^{25} = 0$; (C, 0.5%; $CHCl_3$)].

The foregoing detailed description has been given for clearness of understanding only, and no unnecessary limitations should be understood therefrom, as modifications will be obvious to those skilled in the art.

What is claimed is:

1. Antibiotic acidolphilin which has about the following values in elemental analysis: C – 50.28%, H – 8.85%, O – 39.5%, P – <0.1%, N – 1.82%; a molecular weight of about 284; gives a pH of about 2.8 in aqueous suspension and is stable at such pH at 10° to 25° C. for at least one week without loss of antibiotic activity; has an ultraviolet absorption spectrum with no well defined peak below 230 m$\mu$, a point of inflection at about 280 m$\mu$ and a shoulder between 200 and 290 m$\mu$; an infrared absorption spectrum as shown in FIG. 3 with peaks at the wave lengths (in microns) 3.48, 5.87, 6.92, 7.32, 7.97, 9.15, 9.70 and 12.2–12.4, a maximum at 1,722 $cm^{-1}$ and no absorption characteristic of an aromatic ring; an optical rotation for a 0.5 percent solution in chloroform at 589 m $(\alpha)_D^{25} = -7°$ and negligible rotation at the wave lengths of 578 and 436 for the same solution.

2. A process for making the antibiotic defined in claim 1 which comprises cultivating *Lactobacillus acidophilus* NRRL B–3208 in a milk medium under aerobic conditions until substantial antibiotic activity is imparted to said medium by the production of acidophilin, and isolating acidophilin from the culture medium.

TABLE 6
Percent loss of antibiotic activity of acidophilin

| pH | Room Temp., (25° C.) | | | | | Refrigerator Temp. (10° C.) | | | | | Heating | |
|---|---|---|---|---|---|---|---|---|---|---|---|---|
|  | 0 hr. | 24 hr. | 48 hr. | 96 hr. | 168 hr. | 0 hr. | 24 hr. | 48 hr. | 96 hr. | 168 hr. | 100° C/ 30 min. | 15 psi/ 15 min. |
| 2.8 | 0 | 0 | 0 | 0 | 0 | 0 | 0 | 0 | 0 | 0 | 0 | 0 |
| 4.5 | 0 | 0 | 7.2 | 50 | 100 | 0 | 0 | 7.2 | 9.2 | 100 | 90 | 100 |
| 7.0 | 79 | 87 | 100 | 100 | 100 | 79 | 87 | 100 | 100 | 100 | 100 | 100 |

* * * * *